(12) United States Patent
Jussel et al.

(10) Patent No.: US 11,378,336 B2
(45) Date of Patent: Jul. 5, 2022

(54) DENTAL COOLING METHOD AND DENTAL COOLING DEVICE

(71) Applicant: Ivoclar Vivadent AG, Schaan (LI)

(72) Inventors: Rudolf Jussel, Feldkirch-Gisingen (AT); Aleksandar Tubic, Vienna (AT)

(73) Assignee: Ivoclar Vivadent AG, Schaan (LI)

( * ) Notice: Subject to any disclaimer, the term of this patent is extended or adjusted under 35 U.S.C. 154(b) by 218 days.

(21) Appl. No.: 16/696,314

(22) Filed: Nov. 26, 2019

(65) Prior Publication Data
US 2020/0191482 A1    Jun. 18, 2020

(30) Foreign Application Priority Data

Dec. 17, 2018  (EP) ..................................... 18213180

(51) Int. Cl.
| | |
|---|---|
| *C21D 9/00* | (2006.01) |
| *F27B 5/04* | (2006.01) |
| *F27B 5/10* | (2006.01) |
| *A61C 13/00* | (2006.01) |
| *F27B 17/02* | (2006.01) |
| *F27B 5/06* | (2006.01) |

(52) U.S. Cl.
CPC ............ *F27B 5/10* (2013.01); *A61C 13/0007* (2013.01); *F27B 17/025* (2013.01); *F27B 2005/064* (2013.01)

(58) Field of Classification Search
CPC ....... C21D 9/0062; C21D 9/0043; F27B 5/04; F27B 5/06; F27B 5/00; F27D 9/00; F27D 2009/0002; F27D 2009/007
See application file for complete search history.

(56) References Cited

U.S. PATENT DOCUMENTS

| | | | | |
|---|---|---|---|---|
| 1,949,227 | A * | 2/1934 | Wiechert | ................ A61C 13/16 425/175 |
| 3,410,544 | A * | 11/1968 | Beck | .................... C21D 9/0043 165/169 |
| 7,531,769 | B2 * | 5/2009 | Smith | ...................... F27B 5/06 219/390 |
| 8,777,610 | B2 | 7/2014 | Zubler | |
| 10,053,365 | B2 * | 8/2018 | Pascazio | ................... F27B 5/04 |
| 2015/0084246 | A1 * | 3/2015 | Tang | ........................ F27D 9/00 266/46 |
| 2016/0195334 | A1 | 7/2016 | Rohner et al. | |
| 2020/0330199 | A1 * | 10/2020 | Tubic | ................. A61C 13/0007 |

FOREIGN PATENT DOCUMENTS

| | | |
|---|---|---|
| CH | 267808 A | 4/1950 |
| EP | 2550930 | * 1/2013 |

* cited by examiner

*Primary Examiner* — Gregory A Wilson
(74) *Attorney, Agent, or Firm* — Ann M. Knab; Thad McMurray

(57) ABSTRACT

A dental cooling device is provided, comprising a muffle (12) and a medium (30) as cooling source. The medium (30), in particular a liquid medium (30), is stored at least in the outer region of the muffle (12) and has an evaporation temperature higher than the room temperature. The quantity of medium (30) is calculated in advance such that the enthalpy of evaporation of the medium is substantially destroyed or consumed when cooling the muffle (12) to the evaporation temperature.

21 Claims, 2 Drawing Sheets

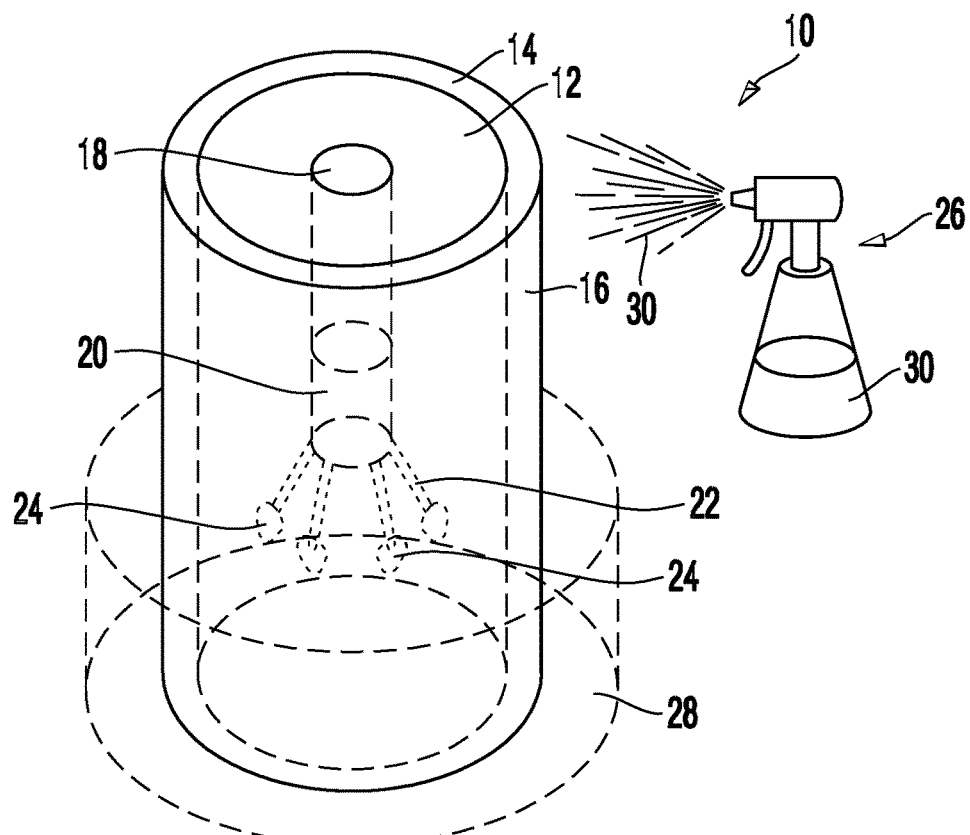
Fig. 1
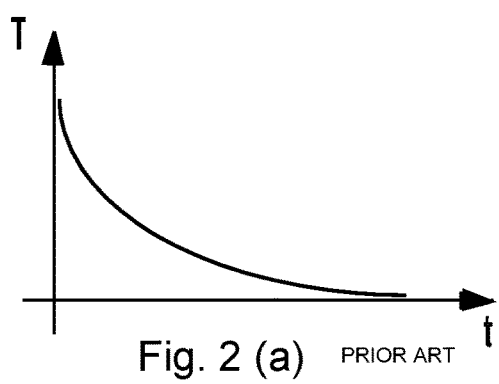
Fig. 2 (a) PRIOR ART
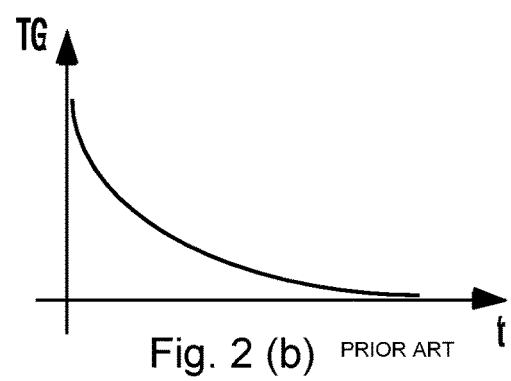
Fig. 2 (b) PRIOR ART
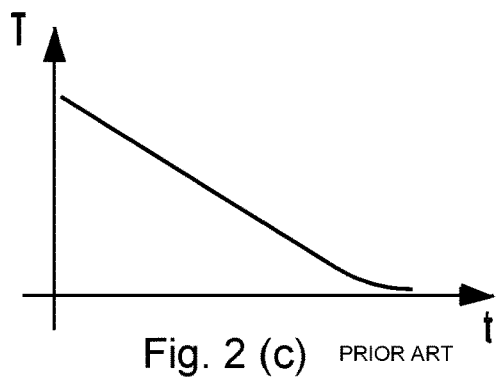
Fig. 2 (c) PRIOR ART
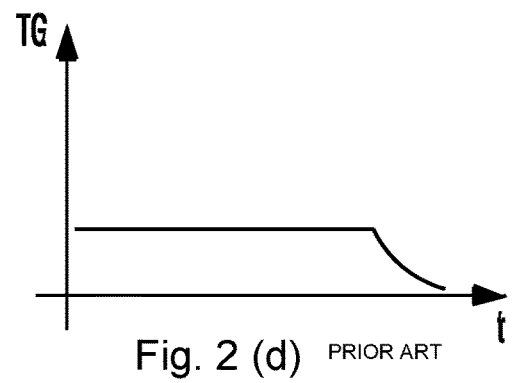
Fig. 2 (d) PRIOR ART

DENTAL COOLING METHOD AND DENTAL COOLING DEVICE

CROSS-REFERENCE TO RELATED APPLICATIONS

This application claims priority to European patent application No. 18213180.5 filed on Dec. 17, 2018, the disclosure of which is incorporated herein by reference in its entirety.

TECHNICAL FIELD

The invention relates to a dental cooling method as well as an appropriate cooling device.

BACKGROUND

It has been long known that, in particular, with larger muffles, such as those having a mass of 300 g, a relatively long time is required to reach a divesting temperature.

In order to accelerate the cooling process, it has been proposed to create an airflow supplying air at room temperature to the muffle from the side of the blower.

Although this solution results in somewhat faster cooling, it has the disadvantage that cooler air is typically located on the side facing the air stream, than on the side facing away from the air stream. A considerable local heat gradient is generated, which may result in stress cracks in the muffle and eventually also impairs the dental material in the muffle.

Tests have shown that cooling with the use of a fan does not improve the quality of the restoration.

It has also been suggested for the muffle to be divided while still in the hot state to improve cooling. This can be done, for example, by sandblasting.

However, there is a risk that rough sandblasting will not only remove the outer part of the muffle, but will also damage the dental restoration part(s), thus deteriorating the restoration result.

Another disadvantage of this procedure is the enormous consumption of sandblasting media. It is required for the sand blasting medium used, together with the hot released parts of the muffle, to be removed in a dedicated housing without causing damage to the equipment, which is used for this purpose.

Therefore, nowadays the divesting process is predominantly carried out such that the muffle including the embedded dental restoration part or parts is placed on a base, preferably having grid apertures, and is maintained thereon until it has cooled down to such an extent that divesting may smoothly be performed.

However, this procedure is known to be quite time-consuming, although it is gentle on the material.

SUMMARY

Thus, the object of invention is to provide a process for cooling dental restoration products according to the claims, as well as an appropriate dental cooling device according to the claims, which combines the advantages of previously known processes without causing any disadvantages, i.e. achieving rapid, but gentle cooling of dental restoration parts with no or at most little economic disadvantages.

According to the invention, this object will be solved by the claims. Advantageous embodiments will arise from the subclaims.

According to the invention, it is provided to feed a cooling source comprising a specific medium, preferably a liquid medium, to the muffle without any further handling. The medium penetrates into the outer regions of the muffle, especially if it is liquid, but preferably only penetrates the outer third or at most the outer half, so that no contact can develop between the medium and the dental restorations therein.

According to the invention, it is provided to make use of the additional enthalpy required at a phase transition temperature of the medium.

A phase transition as considered herein occurs from the solid to the liquid and from the liquid to the gaseous states.

The muffle initially is at a higher temperature than the phase transition temperature of the medium. Due to the intensive thermal contact, the medium is heated to the phase transition temperature, and is preferably heated beyond this temperature.

This automatically makes use of the phase transition enthalpy of the medium, e.g. the enthalpy of vaporization or the enthalpy of fusion or both. Thus, a latent heat accumulator is used.

This is made use of during phase transition: The thermal energy of the muffle essentially is converted into enthalpy of vaporization and/or enthalpy of fusion of the medium and is consumed in this way, so that heat is intensively withdrawn from the muffle, resulting in surprisingly rapid cooling of the outer region of the muffle.

Surprisingly, this ensures uniform and gentle cooling without the risk of stress cracking. This is because cooling can be carried out uniformly by uniformly feeding the medium to the muffle from all sides or at least from all suitable sides. The medium surrounds the muffle.

If the muffle is cylindrical in shape, it may be advantageous in a typical design, to feed the medium into the muffle in the region of lateral surface thereof, allowing penetration thereinto, and to utilize the enthalpy of vaporization or enthalpy of fusion of the medium, so as to use the medium as an intensive cooling source.

It is to be understood that prior to feeding the medium to the muffle, the medium is cooled to a temperature below the phase transition temperature.

For example, water can be used as a medium. Water has a boiling temperature of about 100 degrees Celsius and, accordingly, at room temperature is below said phase transition temperature.

Thus, if the medium is supplied in the form of water to a lateral surface of the muffle at room temperature while the muffle is still at a high temperature, such as 700 degrees Celsius, the enthalpy of vaporization of water will exert a direct effect.

In an advantageous embodiment, it is provided for the medium to be supplied in a metered manner.

Preferably, a small portion of the medium is first fed to the muffle, such as $\frac{1}{10}$ of the circumferential surface of the muffle. As soon as this water has evaporated, the amount of water supplied will be doubled compared to the first time, and so on. In this way, a cooling curve can be established that significantly deviates from the natural e-function, for example being an almost linear and steep cooling curve, especially above 100 degrees Celsius.

The invention is not limited to the use of water as a medium. For example, hard paraffins having phase transition temperatures between 50 and 62 degrees Celsius may also be used for the transition from the solid to the liquid aggregate state, or alternatively, microcrystalline waxes having slightly higher melting temperatures may be used.

Herein, the heat of fusion or enthalpy of fusion of about 220 kJ per kg may be utilized.

Contrary to this, water has a slightly higher heat of fusion of 330 kJ per kg, but requires cooling to 0 degrees, i.e. well below room temperature, in order to make use of the enthalpy of fusion.

It is also possible to adjust the quantity of medium required for cooling to the requirements, e.g. to increase it; which may also be calculated in advance.

The enthalpy of vaporization of water is considerably higher and is about 2.2 MJ per kg.

According to the invention, contact between the medium and the muffle is desirable. This may be done in any suitable manner. For example, it is possible to provide the muffle with a sleeve, to highly distribute the water due to the capillary effect and to moisten the sleeve to perform initial cooling, and as soon as a specified temperature is reached, for example below 200 degrees Celsius, to gradually perform intensive wetting, and becoming more intensive, until finally the muffle together with the sleeve is inserted into a container filled with water.

According to the invention, it is important for the medium to be supplied evenly around the dental restoration section. In combination with increasing supply of the medium, this will result in a constant temperature gradient within the muffle, which, according to the invention, is used to ensure both rapid cooling and to avoid stress cracks, and thus damage to the objects embedded in the muffle.

It is to be understood that the medium is absorbed in a means of transport, such as a sleeve, for example, having sufficient temperature resistance. An appropriate sleeve may be made of rock wool, for example, or another high-temperature thermal insulation fiber.

It is also possible to provide a water-impregnated base and to constantly roll the muffle across the base, possibly provided with a sleeve or also without a sleeve, for example by moving back and forth, but it must be ensured that the circumference of the muffle is always covered during translational movements.

Therefore, the base is required to have a length of at least 2*radius*Pi.

It is preferable, to exclude the cavity of the press plunger or press piston which has been used for pressing the dental restoration part from supplying the medium. It is typically arranged in the center of the muffle so that it does not come into contact with the medium when the medium is fed into the outer circumference of the muffle. If the muffle is to be immersed in a vessel filled with medium, it is also possible to cover the central region with a stopper.

If necessary, such immersion may take place at the end of the cooling phase in order to maintain a certain temperature gradient, and thus suitable cooling, despite a small temperature difference between the dental restoration parts and the room temperature.

The medium may also be supplied such that it has completely consumed its phase transition enthalpy at the end of the cooling process. If, for example, a boiling temperature is used as the phase transition temperature, the medium may have been completely evaporated at the end of the cooling process.

This has the advantage that the muffle is devoid of medium during divesting.

It is also possible to measure the muffle temperature, and thus indirectly the temperature of the dental restoration part, with appropriate sensors to detect the start and end of the cooling process and to adjust the temperature gradient to the desired values.

It is also possible to attach a humidity sensor to the muffle to check the evaporation state of the medium in or on the muffle.

It is also possible to in advance calculate the quantity of the medium to be supplied in the desired cooling process and to realize a container in which the muffle is placed and then to gradually supply the desired quantity of the medium to this container until the thermal energy of the muffle essentially is converted into the enthalpy of vaporization and/or enthalpy of fusion of the medium and thus will be consumed.

Divesting of the medium may be done in a suitable manner, for example by sandblasting. It is also possible to use any other cutting means to achieve rough divesting and to limit sand blasting to fine sand blasting the region of the muffle containing dental restoration parts.

According to the invention, it is also advantageous for the temperature of the muffle to be measured at the beginning of the cooling process. This can be done by using a temperature sensor and/or a bimetal. Cooling by means of the cooling medium will be allowed as soon as the temperature of the freely cooling muffle falls below a specified threshold value.

BRIEF DESCRIPTION OF THE DRAWINGS

Further advantages, details and features will arise from the following description of an example of the invention, while making reference to the drawing, wherein:

FIG. 1 is a schematic representation of a muffle including the dental restoration parts and a sleeve, which are indicated in dashed lines, to represent two embodiments of a cooling method according to the invention and a cooling device according to the invention;

FIGS. 2a to 2d are schematic graphical representations of temperature gradients and temperatures of prior art and according to the invention;

DETAILED DESCRIPTION

Figure 3:
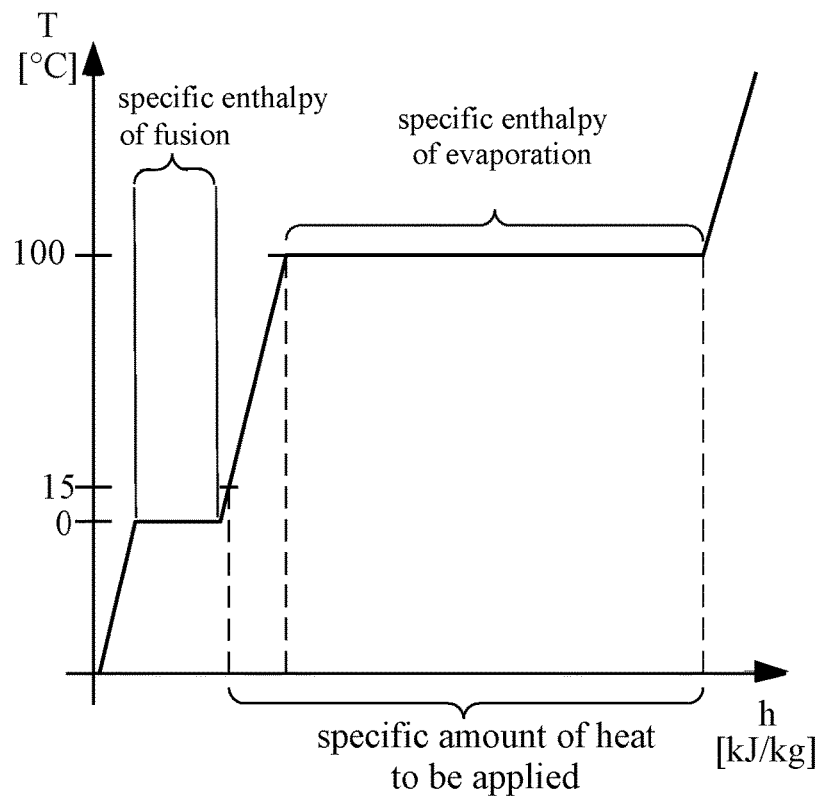
FIG. 3 is a diagram showing the specific enthalpy of fusion and specific enthalpy of vaporization of water.

FIG. 1 shows a schematic representation of a dental cooling device 10 according to the invention. It comprises a muffle 12, which is surrounded by a sleeve 14 on its circumferential surface 16, wherein in the example shown the sleeve 14 slightly protrudes over the muffle.

At the beginning of the cooling, the medium is cooler than the muffle, thus forming a heat accumulator, i.e. a latent heat accumulator for controlled absorption of heat energy from the muffle.

The muffle has a press aperture 18 known per se, in which an $Al_2O_3$ piston 20 is located, separating the press plunger from the blank prior to pressing. In addition, feeder channels 22 extend into the muffle, through which the material to be compressed may penetrate into mold cavities, in which, following pressing, there are dental restoration parts 24.

As it may be seen, they extend slightly outside the channel of the press aperture 18, i.e. slightly more adjacent to the lateral surface 16.

A spray device 26 is also schematically represented in FIG. 1, as is a dashed container 28, which accommodates the muffle 12 and the sleeve 14.

In order to realize the method according to the invention, the muffle 12 is provided with the sleeve 14. The sleeve consists of a high-temperature thermal insulation fiber, such as that offered by Rath. The fiber is heat-resistant up to 1200 degrees Celsius, so that it can be laid over the hot muffle without any damage.

The muffle 12 with the sleeve 14 is inserted into the vessel 28. In this condition, the drum 28 is empty when the muffle is hot, i.e. it is not filled with a medium, such as water.

Following insertion of the muffle 12 into the vessel 28, the spraying device 26 is carefully operated for the first time. The spraying device 26 is filled with the medium 30, for example water or any other suitable cooling heat transfer medium.

The medium 30 is sprayed and reaches the sleeve. Spraying occurs slightly above the center, i.e. at about 70% of the height of the muffle, and is distributed both vertically and horizontally.

Then either the muffle or the spraying device is turned so far that a precedingly dry region of the sleeve 14 can be treated by the spraying device 26.

This is continued until the medium 30 is applied to all circumferential regions of the sleeve 14 by the spraying device 26.

The medium 30 is initially distributed both vertically and horizontally in the outer regions of the rather thick sleeve 14, so that there is uniform penetration of humidity.

It also diffuses inwardly, i.e. towards the muffle 12.

As soon as it meets the lateral surface 16 of the muffle, it evaporates, so that appropriate cooling of the lateral surface occurs.

This is done evenly from all sides after the sleeve 14 has been evenly wetted.

Wetting is maintained and increased, so that the cooling is comparatively more intensive.

At the same time, the temperature difference between the cold medium 30, which, for example, is at room temperature, and the hot muffle 12 decreases.

Finally, the vessel 28 can also be filled with the medium, but not before the cooling cycle is almost completed. This causes the muffle 14 to become intensively wetted across a large area, which is to further cool the muffle.

Due to continuous and constantly increasing wetting the muffle 14, cooling efficiency will be increased. This results in that no exponential temperature gradient is created, but a temperature gradient with a constant slope, at least up to just above room temperature.

This is shown in FIG. 2.

FIG. 2a shows a natural cooling, as it is widely realized, according to which the temperature drops in the form of an e-function.

The temperature gradient, as viewed from the inside to the outside direction, i.e. from the hot dental restoration part to the outside, at the cooling surface, is the first derivative of the temperature.

It is initially large and then sharply declines from the maximum value of the temperature gradient, after the first derivative of an e-function in turn is an e-function.

This is shown in FIG. 2b.

The temperature gradient TG shown herein is the local temperature gradient, i.e. as measured at a point on the muffle just outside the dental restoration parts, but regarded over time.

According to the invention, the temperature is not reduced in the form of an e-function, but as a constant time gradient TG.

Accordingly, a constantly decreasing straight line results for the temperature according to the invention, until this in turn changes into an e-function near room temperature, cf. FIG. 2c.

Accordingly, the local temperature gradient according to the invention, as represented over time, is the first derivative of this straight line, i.e. it is initially constant, up to the start of the e-function.

This is shown in FIG. 2d.

As can be seen from the comparison of FIGS. 2b and 2d, according to the invention, the maximum temperature gradient TG, which is responsible for the generation of stress cracks, is considerably lower than in prior art.

According to the invention, it is provided to limit the quantity of medium used for cooling in such a way as specified herein- or to calculate it in advance such that the medium has been evaporated by the time when the cooling cycle is completed. This prevents the muffle from being impregnated with water, which would make it very hard and could only be removed using very high effort of sandblasting.

It may as well be advantageous to provide a holding time of, for example, 1 minute, at the end of the cooling process according to the invention, during which residual water will be evaporated or vaporized.

While cooling times between 60 min and 90 min, depending on the size of the muffle used, can be expected while using typical cooling, the cooling time could be reduced to 5 min to 15 min according to the invention, without compromising the quality of the dental restoration part, i.e. also without stress cracks.

These cooling times are significantly lower than the cooling times achievable with a fan, reducing them, for example, to ⅓ thereof (10 min compared to 30 min).

FIG. 3 shows the composition of the specific amount of heat to be applied. As can be seen, the specific enthalpy of evaporation, herein that of water, is the clearly predominant part. The amount of cold to be applied for cooling from 100 degrees to 15 degrees—or the corresponding amount of heat—is only a fraction, for example ⅛, of the enthalpy of evaporation.

This explains the specific effectiveness of the method according to the invention.

It is also evident that the enthalpy of fusion is significantly greater than a normally stored quantity of heat lacking phase transition, but significantly lower than the specific enthalpy of boiling.

Figure 4:
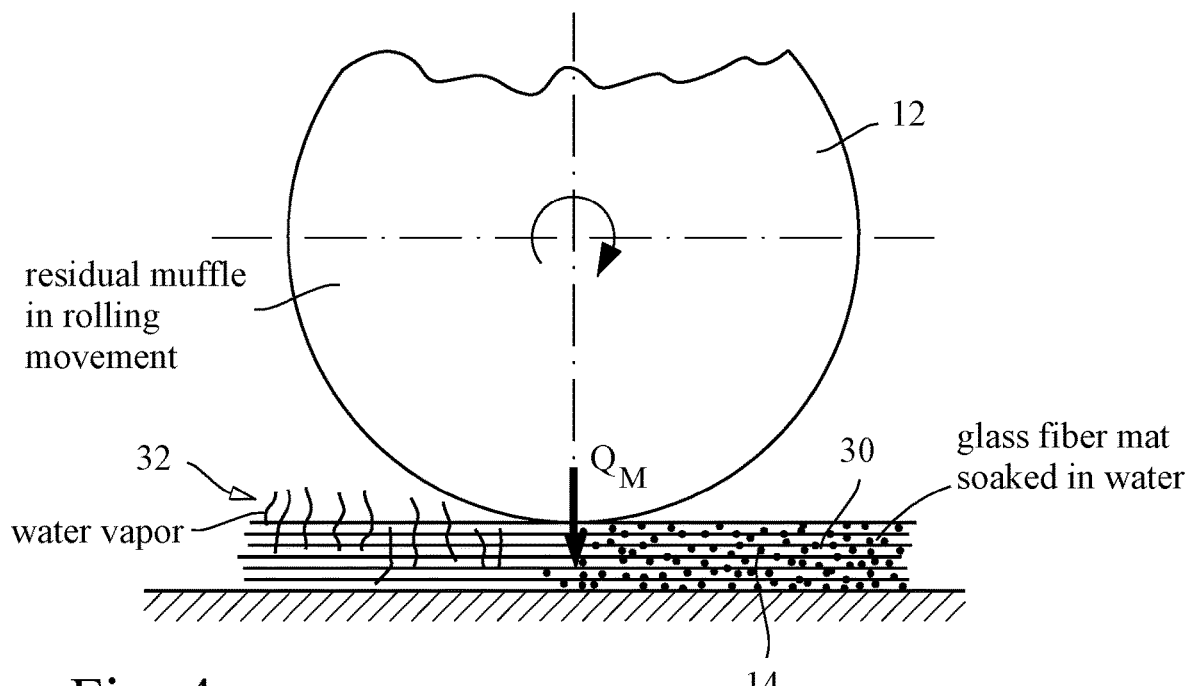
FIG. 4 is a schematic representation of another embodiment of a dental cooling device according to the invention.

FIG. 4 shows how the muffle 12 can be rolled on a sleeve 14. The medium 30 is stored in the sleeve as a latent heat storage and is evaporated following rolling, so that it exits the sleeve as vapor 32. The heat energy of the muffle 12 transferred to the sleeve is represented by $Q_M$ in FIG. 4.

The muffle 12 is rolled once completely to the right on the sleeve 14. The stored water 30 has evaporated to water vapor. The muffle 14 is in turn wetted again and the muffle 12 is unrolled across the muffle 14 to the left, i.e. in the opposite direction, again by at least one revolution.

Herein, it is also possible to control the supply of medium 30, i.e. initially to supply a small amount of medium 30 and then to increase the amount supplied.

The method according to the invention may also be performed in an automated manner. For example, it is possible to provide the spraying device 26 with a rotation guide according to FIG. 1 and to actuate it automatically, first to slightly actuate it and then to increase actuation.

Alternatively, the vessel 28 or the muffle 12 may also be placed on a turntable and rotated continuously, while the medium 30 is fed gradually increasing.

The vessel 28 and a support for the muffle 12 may also be configured such that the muffle 12 will first be slightly immersed and then will be immersed more and more, wherein a liquid level of the medium 30 exists in the vessel 28.

The vessel 28 may also be considerably higher than shown in FIG. 1 and, for example, the muffle 12 may also be completely accommodated.

Furthermore, it is also possible to spray or feed the medium 30 without using a sleeve 14. The spraying device 26 then sprays directly onto the muffle, and levelling is achieved by a more carefully spray distributing.

It is also possible to automate the configuration according to FIG. 4. Rolling the muffle 12 on the sleeve 14 may occur in a controlled manner, for example by the muffle 12 being rotatably mounted on its axis and being rolled, whereby a back and forth movement in a horizontal direction occurs. Alternatively, the bearing of the muffle 12 may also be realized as being rotatable, and the sleeve 14 may be moved back and forth below the muffle. Herein, it is also possible to use any other suitable absorbent base or medium-receiving device instead of the sleeve 14, which makes it possible to absorb the medium 30 and release it again in the form of vapor.

For example, a paraffin or a microcrystalline wax may also be used as a medium, which is dripped onto the base 14, while making use of the enthalpy of fusion of the paraffin.

The paraffin may also be form-fittingly wrapped around or applied to a muffle, e.g. as a metallic sleeve still being elastically deformable but impermeable to liquid paraffin.

The invention claimed is:

1. A dental cooling method for cooling a muffle (12) comprising
   cooling the muffle with a cooling source (12) to a divesting temperature of less than 80° C.,
   wherein the cooling source is a medium (30) having a melting or evaporation temperature higher than room temperature,
   wherein the medium (30) is fed to the muffle (12),
   wherein the cooling is effected by latent heat accumulators,
   wherein a quantity of the medium (30) is at least sufficient such that the muffle (12) is cooled to at least one phase transition temperature of the medium (30), and wherein the medium (30) is accommodated in a high-temperature-resistant, fibrous mass comprising a high-temperature thermal insulation fiber brought into contact with the muffle (12) for cooling the muffle.

2. The method according to claim 1 wherein the divesting temperature is less than 50° C., wherein the medium (30) comprises a solid or liquid medium (30),
   wherein feeding the medium to the muffle comprises bringing the medium into direct or indirect contact with the muffle,
   wherein the quantity of the medium (30) is calculated in advance.

3. The method according to claim 1,
   wherein during cooling to the at least one phase transition temperature, the thermal energy of the muffle is converted substantially into the enthalpy of vaporization and/or enthalpy of fusion of the medium (30), and is consumed.

4. The method according to claim 1,
   wherein the cooling of the muffle (12) by means of the cooling source is performed to a temperature below the phase transition temperature.

5. The method according to claim 1,
   wherein the muffle (12) is cooled by contacting from a temperature above a phase transition temperature to a temperature below the phase transition temperature.

6. The method according to claim 1,
   wherein the medium (30) is predominantly supplied to a lateral surface of the muffle (12) or is brought into direct or indirect contact with the lateral surface of the muffle.

7. The method according to claim 1,
   wherein the muffle (12) is at least partially surrounded by a sleeve (14) providing the medium (30) for cooling the outside of the muffle.

8. The method according to claim 7,
   wherein the muffle (12) is completely surrounded and circumferentially surrounded by the sleeve (14).

9. The method according to claim 1,
   wherein the high-temperature thermal insulation fiber that is brought into contact with the muffle (12) for cooling the muffle is performed by mutually rolling at selective locations of the muffle (12).

10. The method according to claim 9,
    wherein the high-temperature-resistant fibrous mass is brought into contact with the muffle (12) for cooling thereof by mutually rolling at all locations of the circumference of the muffle (12).

11. The method according to claim 1,
    wherein the medium (30), evenly distributed around the periphery of the muffle (12), is supplied to the muffle at the start of the cooling method by spraying or immersion in a suitable container or both by spraying and immersion.

12. The method according to claim 1,
    wherein the medium (30) is completely liquefied or evaporated in and at the muffle (12) at the end of the cooling method.

13. The method according to claim 1,
    wherein a moisture sensor or a plurality of moisture sensors detect the moisture content of the medium (30) or the muffle (12) or the temperature of the muffle (12) at the end of the cooling process, and
    wherein a control device initiates divesting of a dental restoration part from the muffle (12) when the moisture and/or temperature measured falls below a predetermined threshold value.

14. The method according to claim 1,
    wherein a pot-shaped container is provided for receiving the medium (30), an inner diameter of which pot-shaped container exceeds an outer diameter of the muffle (12) by a small amount, and
    wherein an annular gap resulting between the muffle (12) and the container is calculated with respect to a volume such that the volume corresponds to a quantity of the medium (30) of which an enthalpy of vaporization is to be consumed.

15. The method according to claim 1,
    wherein, when calculating an enthalpy of fusion and/or enthalpy of evaporation, addition or deduction for the mass of the cooling medium to be provided is included, depending on whether the divesting temperature is below the melting temperature or evaporation temperature (addition) or above (deduction).

16. The method according to claim 1,
    wherein, at the start of the cooling method, the temperature of the muffle (12) is detected, and wherein cooling is enabled by the cooling medium as soon as the temperature of the muffle (12), which is freely cooling down, falls below a predetermined threshold value.

17. The method according to claim 1, wherein after completion of the cooling method, a dental restoration part in the muffle (12) is divested.

18. The method according to claim 1, wherein after complete liquefaction or evaporation of the cooling medium, a dental restoration part in the muffle (12) is divested by sand blasting.

19. A dental cooling device comprising
a muffle (12) and
a medium (30) as cooling source,
wherein the medium (30) is stored at least in an outer circumferential region of the muffle (12) and has an evaporation temperature exceeding room temperature,
wherein the quantity of the medium (30) is calculated in advance such that the thermal energy of the muffle is substantially converted into enthalpy of vaporization and/or enthalpy of fusion of the medium (30) as a result of cooling the muffle (12), and the thermal energy is consumed, and
wherein the medium (30) is accommodated in a high-temperature-resistant, fibrous mass comprising a high-temperature thermal insulation fiber brought into contact with the muffle (12) for cooling the muffle.

20. The dental cooling device according to claim 19, wherein the medium comprises a liquid medium (30).

21. The cooling device according to claim 19, comprising one or more of the following:
wherein the muffle (12) is cylindrical,
wherein the cooling medium is located on a lateral surface and in an upper or outer region of the muffle (12), and
wherein a sleeve (14) impregnated or filled with the medium (30) surrounds the muffle (12).

* * * * *